United States Patent [19]

Kaku et al.

[11] Patent Number: 5,459,172

[45] Date of Patent: Oct. 17, 1995

[54] PROCESS FOR MANUFACTURING POLYURETHANE FOAMS

[75] Inventors: Motonao Kaku, Hirakata; Hidefumi Ohta, Kohga; Futoshi Kitatani, Kyoto; Kozaburo Nagata, Kusatsu, all of Japan

[73] Assignee: Sanyo Chemical Industries, Ltd., Kyoto, Japan

[21] Appl. No.: 351,154

[22] Filed: Nov. 30, 1994

[30] Foreign Application Priority Data

Dec. 15, 1993 [JP] Japan .................. 5-343661

[51] Int. Cl.$^6$ .................. C08G 18/32; C08G 18/48; C08G 18/66
[52] U.S. Cl. .................. 521/174; 521/155
[58] Field of Search .................. 521/174, 155

[56] References Cited

U.S. PATENT DOCUMENTS 4,111,865  9/1978  Seefried, Jr. et al. .................. 521/137
4,689,357  8/1987  Hongu et al. .................. 521/137

FOREIGN PATENT DOCUMENTS 0367283  5/1990  European Pat. Off. .
63-75021  4/1988  Japan .

*Primary Examiner*—Thomas Hamilton, III
*Attorney, Agent, or Firm*—Oblon, Spivak, McClelland, Maier & Neustadt

[57] ABSTRACT

The present invention is directed to flexible polyurethane foams useful as seat cushioning material for vehicles, aircraft, furniture and the like. The polyurethane foams are characterized by improved wet compression set properties, improved firmness, resilience and elongation. The foams are made by a process which comprises reacting a polyol having a hydroxyl equivalent of from 800–10,000, a glycerin derivative having oxyethylene groups thereon but characterized by having a significant number of unreacted secondary hydroxyl groups of glycerin, (c) water and (d) an organic polyisocyanate.

22 Claims, No Drawings

PROCESS FOR MANUFACTURING POLYURETHANE FOAMS

BACKGROUND OF THE INVENTION

1. Field of the Invention

The present invention relates to a process for manufacturing flexible or low density polyurethane foams. In particular, the present invention relates to a process for manufacturing polyurethane foams with improved wet compression set properties, firmness, resilience and elongation, without using fluorocarbons as auxiliary blowing agents. The invention also provide processes for manufacturing flexible polyurethane foams with density of up to 45 kg/m$^3$, preferably from 15 to 45 kg/m$^3$.

The flexible polyurethane foams produced by the process of the present invention can be used as seat cushioning material for vehicles, aircraft, furniture and the like.

2. Background of the Invention

In conventional processes for manufacturing flexible polyurethane foams having density of 45 kg/m$^3$ or less employing water without low boiling point fluorocarbons, for example, Fron 11 and Fron 123 which destroys ozone layers, as auxiliary blowing agents, a greater deal of water has needed to be used on an equal foaming magnification basis. Polyurethane foams obtained thus possessed lowered resilience property and increased wet compression set property.

To improve these drawbacks, processes of, as a member of polyols, using ethylene oxide adducts of tetraols are disclosed in Japanese unexamined application No. 75021/1988 and those of using ethylene oxide adducts of di- or tri-functional starter compounds are proposed in EP 367283.

However, polyurethane foams produced by the former processes have lowered elongation property and those by the latter processes have insufficient firmness in spite of being improved in wet compression set and elongation properties.

Inventors of the present invention examined relations of type and structure of a starter compound with amount of ethylene oxide to be added to the compound and found the followings.

(1) Starter compounds having hydroxyl groups of 4 or more provide polyurethane foams with lowered elongation property.

(2) Starter compounds having hydroxyl groups of 2 or less provide polyurethane foams with lowered firmness.

(3) Ethylene oxide adducts of trimethylol propane and those of glycerin having no secondary hydroxyl group are easy to provide, because of great reactivity of these adducts with polyisocyanates due to primary hydroxyl groups incorporated therein, polyurethane foams with closed-cell structure or insufficient wet compression set improvement.

In consideration of these findings, inventors of the present invention created a process for making flexible polyurethane foams having increased firmness and resilience properties without significant worsening of wet compression set and elongation property by using combinations of high molecular weight polyols with specified hydroxyl equivalent, ethylene oxide adducts of glycerin with a secondary hydroxyl group and water as a blowing agent.

SUMMARY OF THE INVENTION

Accordingly, one object of the present invention is to improve the wet compression set property of flexible polyurethane foams.

Another object of the present invention is to improve the firmness property of flexible polyurethane foams.

Another object of the present invention is to improve the resilience property of flexible polyurethane foams.

Another object of the present invention is to improve the elongation property of flexible polyurethane foams.

Another object of the present invention is to provide processes for manufacturing of high resilience polyurethane foams obtained from molding and slab stock processes without volatile fluorocarbons.

A further object of the invention is to provide processes for manufacturing of flexible polyurethane foams with density of up to 45 kg/m$^3$, preferably from 15 to 45 kg/m$^3$.

A still further object is to provide processes for manufacturing of flexible polyurethane foams with improved wet compression set, firmness, resilience and elongation properties which can be used as seat cushioning material for vehicles, aircraft, furniture and the like.

The present inventors have now found that these and other objects are met by a process for manufacturing polyurethane foam comprising reacting (a) a polyol having a hydroxyl equivalent of from 800 to 10,000, (b1) a first glycerin derivative of the formula:

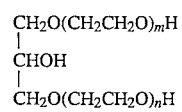

where n and m are zero or an integer such that the sum of n and m ranges from 1 to 8, or (b2) a mixture of the first glycerin derivative and a second glycerin derivative of the formula:

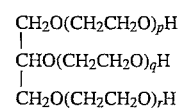

where p and r are zero or an integer, q is an integer of 1 or more such that the sum of p, q and r ranges from 1 to 8, and (c) water, with an organic polyisocyanate in the presence of a catalyst.

DETAILED DESCRIPTION OF THE INVENTION

Suitable polyols useful in accordance with the present invention include those known and used in polyurethane industry, provided that their hydroxyl equivalent ranges from 800 to 10,000. Suitable polyols include polyether polyols, polyester polyols, polymer/polyols and combinations thereof.

Suitable polyether polyols include random or block alkylene oxide adducts of alcohols, amines or ammonia.

Suitable alcohols to be useful in the preparation of the polyether polyols include dihydric alcohols such as ethylene glycol, propylene glycol and 1,6-hexane diol; trihydric alcohols such as glycerin and trimethylol propane; tetrahydric alcohols such as pentaerythritol and methyl glycoside; and octahydric alcohols such as sucrose.

Suitable amines useful in the preparation of the polyether polyols include monoamines such as methyl amine, ethyl amine and aniline; alkanolamines such as monoethanol amine, diethanol amine, triethanol amine and isopropanol amine; and diamines such as ethylene diamine and hexamethylene diamine.

Suitable alkylene oxides useful in the preparation of the polyether polyols include ethylene oxide, propylene oxide, 1,2-, 1,4- or 2,3-butylene oxide and combinations thereof. Among these, ethylene oxide, propylene oxide and combinations thereof are preferred.

In addition, alkylene oxide adducts of monohydric alcohols such as methanol, butanol and secondary monoamines, (e.g., dimethylamine and diethylamine) may be added in small amounts (up to 10 parts by weight) together with polyether polyols to obtain softer polyurethane foams at a slight sacrifice in set properties.

Suitable polyester polyols include polyester polyols obtained by condensation reaction of the above mentioned di- or trihydric alcohols with polycarboxylic acids such as adipic acid, maleic acid, phthalic acid and trimellitic acid; polylactone polyols obtained by ring-opening polymerization of lactones such as ε-caprolactone; and polyester polyols recovered by glycolysis of polyester (usually aromatic polyester) molded products waste.

Suitable polymer/polyols include polymer/polyols obtained by the in situ polymerization of vinyl monomers such as acrylonitrile, styrene and vinylidene chloride and the above mentioned polyether polyols in the presence of radical initiators. The content of the vinyl polymers in the polymer/polyols is usually 20 to 50% by weight.

Among the above polyols, polyether polyols, polymer/polyols and combinations thereof are preferred. Ethylene oxide-capped polyether polyols are particularly preferred.

Polyols according to the present invention suitably have a hydroxyl equivalent of from 800 to 10,000, preferably from 1,500 to 3,000. Polyurethane foams which are rigid and stiff and decreased in resilience and elongation properties are obtained if the hydroxyl equivalent is below 800. Polyurethane foams with density of 45 kg/m³ or below are difficult to manufacture when the hydroxyl equivalent exceeds 10,000.

The polyol or polyol mixture according to the present invention usually has, on an average, of from 2.5 to 5, preferably from 3 to 4, hydroxyl groups. Polyurethane foams are increased in compression set and wet compression set properties when the average number of hydroxyl groups is below 2.5 and decreased in resilience and elongation properties when the average number of hydroxyl groups exceeds 5.

Suitably, the first glycerin derivative is of the formula:

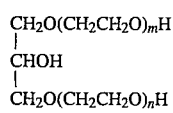

where n and m are zero or an integer such that the sum of n and m is of from 1 to 8, preferably from 2 to 4.

Suitable first glycerin derivatives include those known as comonomers of polyacetal resins such as described in U.S. Pat. No. 3,457,228 and GB 1,171,107 and prepared according to YUKAGAKU, vol.26, pp. 179–181 (published in Japan). These first glycerin derivatives can also be prepared by hydrolysis of the reaction products obtained from reaction of 1,2-diacetin with ethylene oxide or α-halogeno-ω-hydroxy mono or polyoxyalkylene ether.

Suitable first glycerin derivatives include 3-hydroxy ethoxy propylene glycol, 3-(hydroxydiethoxy)propylene glycol, 3-(hydroxytriethoxy)propylene glycol, 3-(hydroxytetraethoxy)propylene glycol, 1,3-bis-(hydroxyethoxy)isopropanol, 1,3-bis-(hydroxydiethoxy)isopropanol, 1,3-bis-(hydroxytriethoxy)isopropanol, 1,3-bis-(hydroxytetraethoxy)isopropanol, 1-hydroxyethoxy-3-hydroxydiethoxy isopropanol, 1-hydroxyethoxy-3-hydroxydiethoxy isopropanol and combination thereof.

The average molar ratio of ethylene oxide to glycerin is of from 1:1 to 8:1. Polyurethane foams obtained are decreased in resilience when below this average molar ratio is below 1:1 and too soft when the average mole ratio exceeds 8:1.

Alternatively, the first glycerin derivative may be mixed with a second glycerin derivative, in which ethylene oxide is added to the 2-hydroxyl group of glycerin, of the formula:

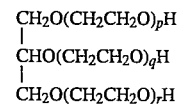

where p and r are zero or an integer, q is an integer of 1 or more such that the sum of p, q and r is of from 1 to 8, preferably of from 2 to 4.

The second glycerin derivative may be present in a proportion such that the number of secondary hydroxyl groups, namely the number of hydroxy groups at position 2 of glycerin, is at least 6%, preferably of not less than 10%, based on total number of hydroxyl groups in the mixture of the first and second derivatives. Polyurethane foams with closed-cell structure are obtained, because of causing rapid polymerization reaction with polyisocyanates, when the mixture with content of number of secondary hydroxyl group of below 6%, in particular when low mole ethylene oxide adducts are used, and those with lowered firmness values are obtained when the mixture comprising higher mole ethylene oxide adducts with the same content level is used.

The mixture with content of secondary hydroxyl group of at least 6% is also advantageous from standpoint of economy and reactivity with polyisocyanates and provide flexible polyurethane foams with open-cell structure and increased firmness and decreased wet compression set properties.

The content of the second glycerin derivative in the mixture can be determined by measuring intensity ratio of characteristic peak based on the primary and secondary hydroxyl groups by Proton Nuclear Magnetic Resonance Spectroscopy analysis.

Polyisocyanates according to the present invention are conventionally available and are used in preparation of polyurethane resins.

Suitable polyisocyanates include $C_{6-28}$ aromatic polyisocyanates (where the carbon atom in the isocyanate group is not counted) such as 2,4- or 2,6-tolylene diisocyanate (TDI), crude TDI, 2,4- or 2,6-diphenyl methane diisocyanate (MDI, 1,3- or 1,4- phenylene diisocyanate, crude MDI, polyarylene polyisocyanates; $C_{2-18}$ aliphatic polyisocyanates (where the carbon atom in the isocyanate group is not counted) such as hexamethylene diisocyanate, lysine diisocyanate; $C_{4-15}$ alicyclic polyisocyanates (where the carbon atom in the isocyanate group is not counted) such as isophorone diisocyanate, cyclohexylene diisocyante, dicyclohexyl diisocyanate; modified polyisocyanates thereof such as polyisocyanates having carbamate, carbodiimide, allophanate, urea, urethodione, biuret, urethoimine, isocyanurate or oxazolidone groups; polyisocyanates disclosed in JP 76517/198, for example, xylylene diisocyante; and combinations thereof.

Among them, TDI and mixtures of TDI and MDI with TDI content of at least 70% by weight from standpoint of compression set, wet compression set, resilience and elongation properties are preferred, with TDI particularly preferred.

Suitable catalyst or catalysts according to the present invention may be one known and used in preparation of polyurethane resins. Suitable catalysts include metal carboxylates such as sodium acetate, lead octoate, cobalt naphthenate and tin octoate; alkali or alkaline metal alkoxides or phenoxides such as sodium methoxide and sodium phenoxide; tertiary amines such as triethyl amine, triethylene diamine, N-methylmorpholine, dimethylaminomethyl phenol and pyridines; quaternary ammonium salts such as tetraethyl ammonium hydroxide; imidazoles such as imidazole and 2-ethyl-4-methyl imidazole; and organo-tin or antimony compounds such as tetraphenyl tin and tributyl antimony oxide. Among them, tertiary amines, metal carboxylates and organo-tin or antimony compounds are preferred.

The first glycerin derivative is suitably present in 1 to 5 parts by weight (pbw), preferably 2 to 4 pbw, based on 100 pbw of polyols.

Mixtures of the first and second glycerin derivative are suitably present in 1.5 to 7 pbw, preferably 2 to 5 pbw, based on 100 pbw of polyols.

When the first glycerin derivative is used in amount of below 1 pbw or the mixtures are used in amount of below 1.5 pbw per 100 pbw of polyols, the polyurethane foams obtained have increased compression set and wet compression set properties. When the first glycerin derivative is used in amount of above 5 pbw or the mixtures are used in amount of above 7 pbw, per 100 pbw of polyols, the polyurethane foams obtained have decreased resilience property or unstable cell structure.

Water suitably is present in 2.5 to 8 pbw, preferably 3 to 5 pbw, based on 100 pbw of polyols. When water is used in amount of below 2.5 pbw per 100 pbw of polyols, the polyurethane foams obtained have density of above 45 kg/m$^3$ or decreased foaming magnification. When water is used in amount of above 8 pbw, the polyurethane foams obtained are too brittle to be of practical use.

Polyisocyanates may be used in amount ranging from isocyanate index (NCO index) of from 70 to 130, preferably from 85 to 115. When the index is below 70, the polyurethane foams obtained have increased compression set and wet compression set properties, and low productivity because of requirement of long curing time. When the index is above 130, the polyurethane foams obtained are too brittle to be of practical use.

The catalyst or catalysts are suitably present in 0.01 to 5 pbw, preferably 0.05 to 3 pbw, based on 100 pbw of polyols.

The composition of the present invention can be processed by blending the polyols, the first glycerin derivative or mixtures of the first and second glycerin derivative, catalysts, water and optionally, chain extenders (or crosslinking agents) and/or foam stabilizers, and then mixing by known means and reacting the preblends with polyisocyanates.

The processes of the invention are applicable for known system such as slab stock, hot-cure and cold-cure moldings systems.

Chain extenders or cross-linkers to be used if needed may be one known and used in preparation of polyurethane resins. Suitable chain extenders or crosslinkers include ethylene glycol, diethanol amine, triethanol amine, glycerin, trimethylol propane and D-sorbitol. Chain extenders or crosslinkers comprise up to 5 pbw based on 100 pbw of polyols.

Foam stabilizers to be used if needed may be one known and used in preparation of polyurethane resins. Suitable foam stabilizers include those of dimethyl siloxanes type which are available from Nippon Unicar company in Japan as trademarks of SZ-1306, L-520, L-540, L-5309 and L-5366 and from Toray Silicone Company in Japan as trademarks of SH-190, SH-193 and SRX-274C. Foam stabilizers comprise up to 10 pbw, preferably 1 to 5 pbw, based on 100 pbw of polyols.

EXAMPLE

Having generally described the present invention, a further understanding can be obtained by reference to certain specific examples which are provided herein for purposes of illustration only and are not intended to be limiting unless otherwise specified.

Glossary of Terms

High molecular weight polyols (A)

A-1: An adduct of propylene oxide and ethylene oxide to glycerin which is capped with 19% by weight of ethylene oxide and has a hydroxyl equivalent of 1,600.

A-2: A polymer polyol, which contains 40% by weight of the following vinyl polymer, prepared by polymerizing acrylonitrile and styrene in weight ratio of 1:1 in the presence of an adduct of propylene oxide and ethylene oxide to pentaerythritol which is capped with 12% by weight of ethylene oxide and has a hydroxyl equivalent of 1,600.

A-3: A polymer polyol, which contains 40% by weight of the following vinyl polymer, prepared by polymerizing a mixed monomer of acrylonitrile, styrene and vinylidene chloride in weight ratio of 38:50:12 respectively in the presence of an adduct of propylene oxide and ethylene oxide to glycerin which is capped with 19% by weight of ethylene oxide and has a hydroxyl equivalent of 1,800.

Glycerin derivatives (B)

B-1: A compound made by reacting 2 moles of ethylene oxide with 1 mole of glycerin which contains 50 mole % of glycerin derivatives holding secondary hydroxyl group of glycerin and contains the number of secondary hydroxyl group of 14.6% (measured) [16.7% (theoretical)], provided that the theoretical value is calculated on the assumption that reactivity of each hydroxyl group in glycerin molecule with ethylene oxide is same.

B-2: A compound made by reacting 3 moles of ethylene oxide with 1 mole of glycerin which contains 40 mole % of glycerin derivatives holding secondary hydroxyl group of glycerin and contains the number of secondary hydroxyl group of 13.3% (measured) [12.9% (theoretical)], provided that the above assumption is applied.

B-3: 3-hydroxydiethoxy-1,2-propane diol,

Other polyols (C)

C-1: An adduct of propylene oxide and ethylene oxide to glycerin which is capped with 12% by weight of ethylene oxide and has a hydroxyl equivalent of 500.

C-2: Glycerin (Content of secondary hydroxyl group is about 33%).

C-3: A compound made by reacting 10 moles of ethylene oxide with 1 mole of glycerin which contains 17 mole % of glycerin derivatives holding secondary hydroxyl group of glycerin and contains the number of secondary hydroxyl group of 4% (measured) [5.6% (theoretical)], provided that the above assumption is applied.

C-4: A compound made by reacting 20 moles of ethylene oxide with 1 mole of glycerin which contains 9 mole % of glycerin derivatives holding secondary hydroxyl group of glycerin and contains the number of secondary hydroxyl group of 2% (measured) [3% (theoretical)], provided that the above assumption is applied.

C-5: An adduct made by reacting 2 moles of ethylene oxide with 1 mole of trimethylol propane (content of secondary hydroxyl group is none).

C-6: An adduct made by reacting 6 moles of ethylene oxide with 1 mole of pentaerythritol (content of secondary hydroxyl group is none).

C-7: 2-Hydroxydiethoxy-1,3-propane diol.

Polyisocyanates (D)

D-1: "COLLONATE T-80 (TDI, NCO content=48.3%, available from Nippon Polyurethane Industries Company in Japan).

D-2: A mixture of TDI and crude MDI (NCO content= 44.7%, available from the above company).

D-3: A mixture of TDI, crude MDI and modified MDI containing carbamate group(s) in weight ratio of 75:15:10 (NCO content=43.0%).

Catalysts (E)

E-1: "MINICOL L-1020" (33% triethylene diamine solution in propylene glycol, available from Nihon Nyukazai Company in Japan).

E-2: "TOYOCAT ET" (70% bis-N,N-dimethylaminoethyl ether solution in propylene glycol, available from Toso Company in Japan).

Chain extenders or Cross-linking agents (F)

F-1: Diethanol amine.

Foam Stabilizers (G)

G-1: "L-5309" (dimethyl siloxane type, available from Nippon Unicar company in Japan).

G-2: "Y-10515" (dimethyl siloxane type, available from Nippon Unicar company in Japan).

Foaming process

A preblend is prepared by mixing and preconditioning at 25°±1° C. high molecular weight polyols (A), glycerin derivatives (B), other polyols (C), catalysts (E), chain extenders or cross-linking agents (F) and foam stabilizers (G). The preblend is hand-mixed with polyisocyanates (D) preconditioned at 25°±1° C. for 6 seconds at mixing speed of 5,000 r.p.m and then a resulting foam formulation is poured into a cast aluminum mold having dimensions of 400 mm×400 mm×100 mm preconditioned at 62°±2° C.

Foam properties

Density, firmness (25% Indentation Load Deflection), resiliency, compression set and wet compression set of foam products are measured according to Japanese Industry Standard K6401 and their elongation property measured according to the same standard K6301.

Examples 1 to 14 and Comparative Examples 1 to 9

A foam formulation was prepared from the ingredients listed in Tables 1 to 3 below. A polyurethane foam was made according to the above foaming process. The foam was allowed to stand for one overnight after it was demolded. The molded foam product is tested for the items set out in Tables 4 and 5.

TABLE 1

| Components | Parts by weight Example | | | | | | | |
|---|---|---|---|---|---|---|---|---|
| | 1 | 2 | 3 | 4 | 5 | 6 | 7 | 8 |
| A-1 | 80 | 80 | 80 | 80 | 70 | 70 | 20 | 30 |
| A-2 | 20 | 20 | 20 | 20 | | | | |
| A-3 | | | | | 30 | 30 | 80 | 70 |
| B-1 | | 3 | 4 | | | | 4 | |
| B-2 | | | | 3 | 4 | 4 | | 3 |
| B-3 | 2.5 | | | | | | | |
| Water | 4 | 4 | 4 | 4 | 4 | 4.5 | 3 | 3 |
| E-1 | 0.2 | 0.2 | 0.2 | 0.2 | 0.2 | 0.2 | 0.2 | 0.2 |
| E-2 | 0.2 | 0.2 | 0.2 | 0.2 | 0.2 | 0.2 | 0.2 | 0.2 |
| F-1 | 1 | 1 | 1 | 1 | 1 | 1 | 1 | 1 |
| G-1 | 1.5 | 1.5 | 1.5 | 1.5 | 1.5 | 1.5 | 1.5 | 1.5 |
| D-1 | 49.7 | 50.5 | 51.9 | 49.6 | 50.5 | 55.3 | 40.7 | 40.5 |
| NCO index | 100 | 100 | 100 | 100 | 100 | 100 | 100 | 105 |

TABLE 2

| Components | Parts by weight Example | | | | | |
|---|---|---|---|---|---|---|
| | 9 | 10 | 11 | 12 | 13 | 14 |
| A-1 | 70 | 70 | 80 | 20 | 30 | 20 |
| A-2 | 30 | | | 80 | | |
| A-3 | | 30 | 20 | | 70 | 80 |
| B-1 | | | 5 | 3 | 3 | 4 |
| B-2 | 4 | 4 | 0 | | | |
| Water | 4.5 | 4.5 | 4.5 | 3 | 3 | 3 |
| E-1 | 0.2 | 0.2 | 0.2 | 0.2 | 0.2 | 0.2 |
| E-2 | 0.2 | 0.2 | 0.2 | 0.2 | 0.2 | 0.2 |
| G-1 | 1.0 | 1.0 | 1.0 | 1.0 | 1.0 | 1.0 |
| G-2 | 0.5 | 0.5 | 0.5 | 0.5 | 0.5 | 0.5 |
| D-2 | 57.2 | 57.1 | 60.1 | 40.0 | 42.0 | |
| D-3 | | | | | | 42.9 |
| NCO index | 100 | 100 | 100 | 100 | 105 | 100 |

TABLE 3

| | Parts by weight Comparative Example | | | | |
|---|---|---|---|---|---|
| Components | 1 | 2 | 3 | 4 | 5 |
| A-1 | | 80 | 80 | 80 | 80 |
| A-2 | 30 | 20 | 20 | 20 | 20 |
| B-2 | 4 | | | | |
| C-1 | 70 | | | | |
| C-2 | | 0.5 | 2 | | |
| C-3 | | | | 2 | 4 |
| C-4 | | | | | |
| C-5 | | | | | |
| C-6 | | | | | |
| C-7 | | | | | |
| Water | 4 | 4 | 4 | 4 | 4 |
| E-1 | 0.2 | 0.2 | 0.2 | 0.2 | 0.2 |
| E-2 | 0.2 | 0.2 | 0.2 | 0.2 | 0.2 |
| F-1 | 1 | 1 | 1 | 1 | 1 |
| G-1 | 1.5 | 1.5 | 1.5 | 1.5 | 1.5 |
| D-1 | 60.1 | 47.5 | 51.8 | 47.1 | 48.1 |
| NCO index | 100 | 100 | 100 | 100 | 100 |

| | Parts by weight Comparative Example | | | |
|---|---|---|---|---|
| Components | 6 | 7 | 8 | 9 |
| A-1 | 80 | 80 | 80 | 80 |
| A-2 | 20 | 20 | 20 | 20 |
| C-3 | | | | |
| C-4 | 4 | | | |
| C-5 | | 4 | | |
| C-6 | | | 4 | |
| C-7 | | | | 2.5 |
| Water | 4 | 4 | 4 | 4 |
| E-1 | 0.2 | 0.2 | 0.2 | 0.2 |
| E-2 | 0.2 | 0.2 | 0.2 | 0.2 |
| F-1 | 1 | 1 | 1 | 1 |
| G-1 | 1.5 | 1.5 | 1.5 | 1.5 |
| D-1 | 47.2 | 50.8 | 49.6 | 49.7 |
| NCO index | 100 | 100 | 100 | 100 |

TABLE 4

| | Example | | | | |
|---|---|---|---|---|---|
| Foam Properties | 1 | 2 | 3 | 4 | 5 |
| Density kg/m$^3$ | 30.2 | 30.2 | 30.3 | 29.9 | 30.1 |
| Firmness, kgf/314 cm$^2$ | 7.3 | 6.9 | 7.2 | 7.2 | 7.3 |
| Resiliency, % | 56 | 56 | 55 | 56 | 55 |
| Compression set, % | 4.1 | 4.1 | 4.1 | 4.2 | 4.2 |
| Wet compression set, % | 18.0 | 19.5 | 18.2 | 19.0 | 18.1 |
| Elongation, % | 120 | 122 | 124 | 121 | 120 |

| | Example | | | | |
|---|---|---|---|---|---|
| Foam Properties | 6 | 7 | 8 | 9 | 10 |
| Density kg/m$^3$ | 29.9 | 40.2 | 40.1 | 30.2 | 30.0 |
| Firmness, kgf/314 cm$^2$ | 7.2 | 15.0 | 15.9 | 8.1 | 7.9 |
| Resiliency, % | 56 | 62 | 63 | 56 | 56 |
| Compression set, % | 4.3 | 4.8 | 4.7 | 4.3 | 4.3 |
| Wet compression set, % | 19.5 | 14.9 | 14.7 | 19.5 | 19.7 |
| Elongation, % | 120 | 109 | 108 | 113 | 112 |

| | Example | | | |
|---|---|---|---|---|
| Foam Properties | 11 | 12 | 13 | 14 |
| Density kg/m$^3$ | 30.2 | 40.2 | 40.0 | 40.1 |
| Firmness, kgf/314 cm$^2$ | 7.8 | 15.2 | 16.3 | 15.5 |
| Resiliency, % | 55 | 62 | 63 | 62 |
| Compression set, % | 4.2 | 4.5 | 4.2 | 4.1 |
| Wet compression set, % | 18.5 | 14.7 | 14.0 | 14.9 |
| Elongation, % | 110 | 105 | 103 | 105 |

TABLE 5

| | Example | | | | |
|---|---|---|---|---|---|
| Foam Properties | 1 | 2 | 3 | 4 | 5 |
| Density kg/m$^3$ | 30.2 | 30.5 | 30.1 | 29.9 | 30.2 |
| Firmness, kgf/314 cm$^2$ | 12.5 | 6.2 | 6.3 | 5.2 | 5.0 |
| Resiliency, % | 33 | 52 | 53 | 56 | 55 |
| Compression set, % | 5.8 | 6.5 | 6.0 | 4.3 | 4.2 |
| Wet compression set, % | 33.0 | 29.4 | 27.8 | 19.5 | 18.2 |
| Elongation, % | 75 | 108 | 107 | 126 | 122 |

| | Example | | | |
|---|---|---|---|---|
| Foam Properties | 6 | 7 | 8 | 9 |
| Density kg/m$^3$ | 30.4 | 30.1 | 30.1 | 30.2 |
| Firmness, kgf/314 cm$^2$ | 5.0 | 6.8 | 6.9 | 6.8 |
| Resiliency, % | 54 | 56 | 56 | 53 |
| Compression set, % | 4.2 | 5.8 | 4.3 | 6.2 |
| Wet compression set, % | 19.0 | 32.5 | 19.8 | 26.2 |
| Elongation, % | 121 | 125 | 99 | 110 |

What is claimed as new and desired to be secured by Letters Patent of the United States is:

1. A process for manufacturing of a polyurethane foam comprising reacting (a) a polyol having a hydroxyl equivalent of from 800 to 10,000, (b1) a first glycerin derivative of the formula

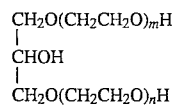

where n and m are zero or an integer such that the sum of n and m is of from 1 to 8, or (b2) a mixture of said first glycerin derivative and a second glycerin derivative of the formula

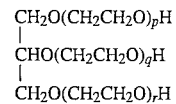

where p and r are zero or an integer, q is an integer of 1 or more such that the sum of p, q and r is of from 1 to 8, and (c) water;

with an organic polyisocyanate in the presence of a catalyst.

2. The process according to claim 1, wherein the polyol is a polyether polyol, a polymer polyol or a combination thereof.

3. The process according to claim 1, wherein the polyol has a hydroxyl equivalent of from 1,500 to 3,000.

4. The process according to claim 1, wherein the polyol is a polyol or polyol mixture having an average number of hydroxyl group of from 2.5 to 5.

5. The process according to claim 4, wherein the polyol is a polyol or polyol mixture having an average number of hydroxyl group of from 3 to 4.

6. The process according to claim 1, wherein the sum of n and m ranges from 2 to 4.

7. The process according to claim 1, comprising of from 1 to 5% by weight based on the polyol of said first glycerin derivative.

8. The process according to claim 1, wherein said polyisocyanate is tolylene diisocyanate or a mixture of at least 70% by weight of tolylene diisocyanate and a modified or crude diphenyl methane diisocyanate.

9. The process according to claim 1, wherein said catalyst is a tertiary amine, a metal carboxylate or an organo-tin or antimony compound.

10. The process according to claim 1, comprising of from 2.5 to 8% by weight based on the polyol of water.

11. A process according to claim 1, wherein said polyurethane foam has a density of up to 45 kg/m$^3$.

12. The process according to claim 1, wherein said mixture of (b2) comprises at least 6% based on total number of hydroxyl groups of a secondary hydroxyl group originated from glycerin.

13. The process according to claim 1, wherein said mixture of (b2) comprises not less than 10% based on total number of hydroxyl groups of a secondary hydroxyl group originated from glycerin.

14. The process according to claim 1, comprising of from 1.5 to 7% by weight based on the polyol of said mixture of (b2).

15. The process according to claim 12, wherein the polyisocyanate is tolylene diisocyanate or a mixture of at least 70% by weight of tolylene diisocyanate and a modified or crude diphenyl methane diisocyanate.

16. The process according to claim 12, wherein the catalyst is a tertiary amine, a metal carboxylate or an organo-tin or antimony compound.

17. The process according to claim 12, comprising of from 2.5 to 8% by weight based on the polyol of water.

18. The process according to claim 12, wherein the polyurethane foam has a density of up to 45 kg/m$^3$.

19. The process of claim 1, wherein said first glycerin derivative (b1) is a compound made by reacting 2 moles of ethylene oxide with 1 mole of glycerin and contains 50 mole % of glycerin derivatives having the secondary hydroxyl group of glycerin.

20. The process of claim 1, wherein said first glycerin derivative (b1) is a compound made by reacting 3 moles of ethylene oxide with 1 mole of glycerin and which contains 40 mole % of glycerin derivatives having the secondary hydroxyl group of glycerin.

21. The process of claim 1, wherein said glycerin derivative (b1) is 3-hydroxydiethoxy-1,2-propanediol.

22. The process of claim 1, wherein said second glycerin derivative is present in a proportion such that the number of secondary hydroxyl groups at position 2 of glycerin, is at least 6%, and not less than 10% based on the total number of hydroxyl groups in the mixture of the first and second derivatives.

* * * * *